United States Patent [19]
Damon

[11] 3,723,957
[45] Mar. 27, 1973

[54] ACOUSTIC NAVIGATION SYSTEM
[75] Inventor: Melvin H. Damon, Pittsford, N.Y.
[73] Assignee: Electronic Navigation Industries Incorporated, Rochester, N.Y.
[22] Filed: Nov. 20, 1970
[21] Appl. No.: 91,315

[52] U.S. Cl. ................................340/5 R, 340/6 R
[51] Int. Cl. ..............................................G01s 3/00
[58] Field of Search ........343/110; 340/3 A, 5 R, 6 R

[56] References Cited

UNITED STATES PATENTS

| | | |
|---|---|---|
| 2,515,472 | 7/1950 | Rich ..............................343/110 X |
| 2,471,648 | 5/1949 | O'Brien ..........................343/110 |
| 2,580,462 | 1/1952 | Ranger ..........................343/110 |
| 3,160,850 | 12/1964 | Dudley ..........................340/6 R |
| 3,181,116 | 4/1965 | Gordon ..........................340/6 R X |

*Primary Examiner*—Richard A. Farley
*Attorney*—Cumpston, Shaw & Stephens

[57] ABSTRACT

A pair of transducer arrays are aimed underwater at a small angle to each other, and a source of acoustic energy is switched back and forth between the transducers under the control of a code generator to produce a pair of nutating beams that have a complementary code. Analogs of the beams are displayed aurally aboard a vessel for distinguishing the two beams by their code signals and detecting the bisecting plane between the beams by a steady tone signal.

10 Claims, 6 Drawing Figures

Patented March 27, 1973  3,723,957

INVENTOR.
MELVIN H. DAMON
BY Cumpston, Shaw &
Stephens
ATTORNEYS

ACOUSTIC NAVIGATION SYSTEM

THE INVENTIVE IMPROVEMENT

The invention involves recognition of a need for better marine navigation systems, and the inventive discovery is a simple, workable acoustic navigation system that has many advantages over present systems. The invention aims at simplicity, economy, reliability, and versatility in an improved acoustic navigation system.

SUMMARY OF THE INVENTION

The inventive system uses a pair of directional acoustic transducer arrays aimed at a small angle to each other to produce a pair of underwater acoustic beams closely straddling a plane bisecting the angle. A source of oscillatory energy is switched back and forth between the transducers under control of a code generator to give the acoustic beams nutating, complementary code patterns. A transducer aboard a vessel receives the beams and aurally displays a direct analog of the beams which can be read by a listener by virtue of the coding. The coding is preferably complementary letters of the Morse alphabet so that a listener hears one letter on one side of the bisector plane, the complementary letter on the other side of the bisector plane, and a steady tone on the bisector plane. Such a system can be used in many ways for navigating the vessel.

DRAWINGS

DETAILED DESCRIPTION

Figure 6:
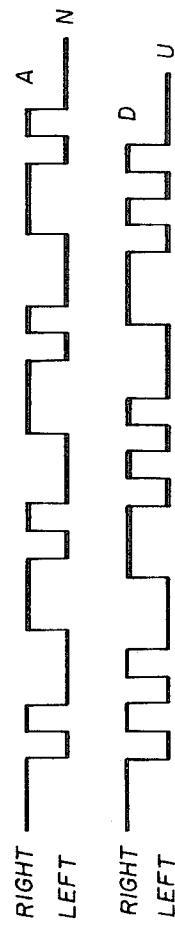
FIG. 6 is a schematic diagram of complementary code patterns for acoustic beams used in the inventive system.

An understanding of the nutating acoustic beams used in the inventive system will facilitate understanding the structural embodiments. Examples of beam nutation are schematically shown in FIG. 6 where pairs of right and left beams are respectively coded to form A and N or D and U of the Morse alphabet as illustrated. The N is complementary to the A and the U is complementary to the D in such a way that a single source of oscillatory energy can be switched back and forth between the right and left transducers with the proper timing to form the illustrated Morse letters. This allows a single source of energy driving both transducers and a single receiver for both beams for greatly simplifying the electronic equipment needed to transmit and receive.

A listener on the right side of the A and N beam pair will receive the N beam with less acoustic intensity than the A beam, and will hear the Morse letter A rather than the weaker letter N. As the listener moves toward the bisector plane between the beams, the N becomes stronger but the A is more intense and identified as the predominant code letter. Experience has shown that a listener can detect the more intense signal up to only a few degrees from the equi-signal bisector plane centered between the two beams. The A and N are equal on the bisector plane, and a listener there hears a steady tone. If he moves to the left of the equi-signal plane the N part of the signal is more intense than the A beam, and the listener identifies the N as the predominant code letter.

From this, a listener can tell whether he is right, left, or on the equi-signal bisector plane, and this information can be used in navigating a vessel. The D and U and other Morse alphabet letters and other codes are complementary in a similar way so that the "off" part of one code is the "on" part of the other code. This allows a single source to be switched back and forth between a pair of transducers, and eliminates problems that arise in using multiple sources, different frequencies and dual receivers that have to be carefully balanced to read the beams. In effect, the capacity of the listener to distinguish the dominant one of a pair of nutating code patterns is used to simplify the system.

Figure 1:
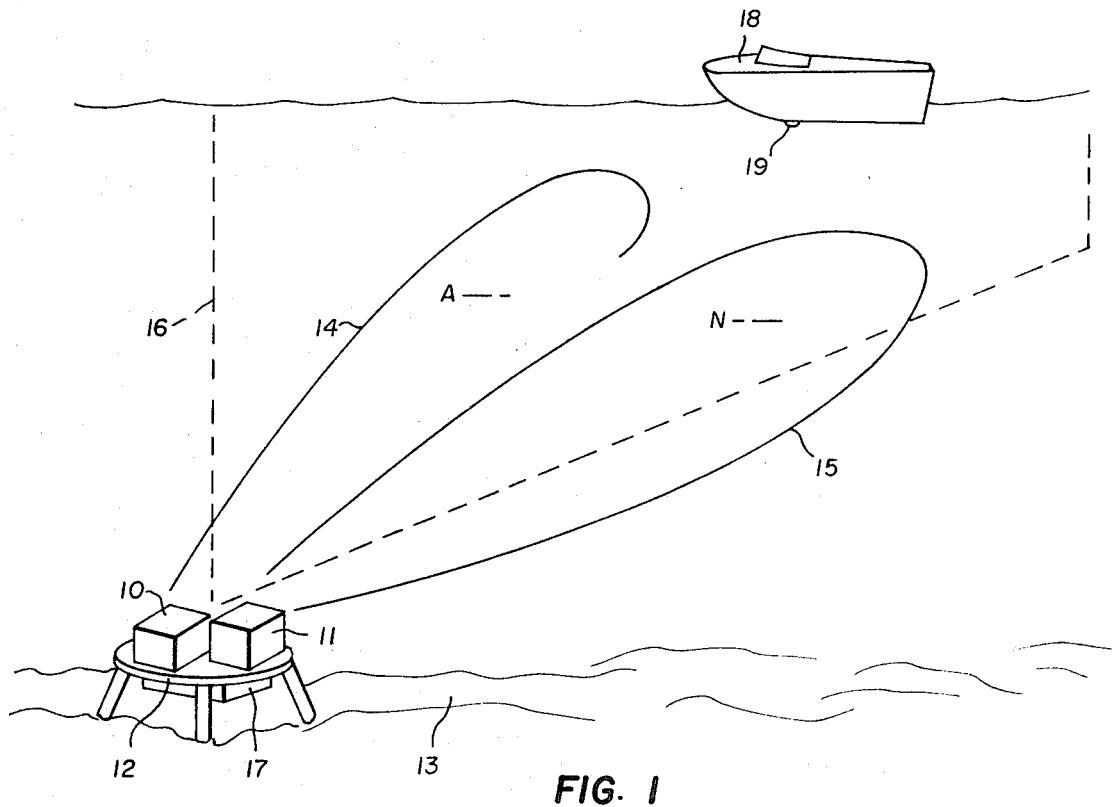
FIG. 1 is a partially schematic, perspective view of a preferred embodiment of the inventive navigation system used to establish a course line.

FIG. 1 shows this concept applied to a course line navigation system such as usable at a harbor entrance. A pair of transducer arrays 10 and 11 are mounted on a stand 12 on the ocean bottom 13 in relatively shallow water and are aimed generally horizontally to form an A beam 14 and an N beam 15 as illustrated. The beams 14 and 15 are set at a small angle to each other and closely straddle an equi-signal bisector plane or channel 16. An energy source 17 is arranged for driving transducers 10 and 11 to produce beams 14 and 15. A vessel 18 carries a transducer 19 for receiving beams 14 and 15 and producing an aural display allowing navigation to and along bisector plane 16 which establishes a desired course line at the surface of the water. Such a course line has many uses as those skilled in navigational arts will appreciate.

Figure 2:
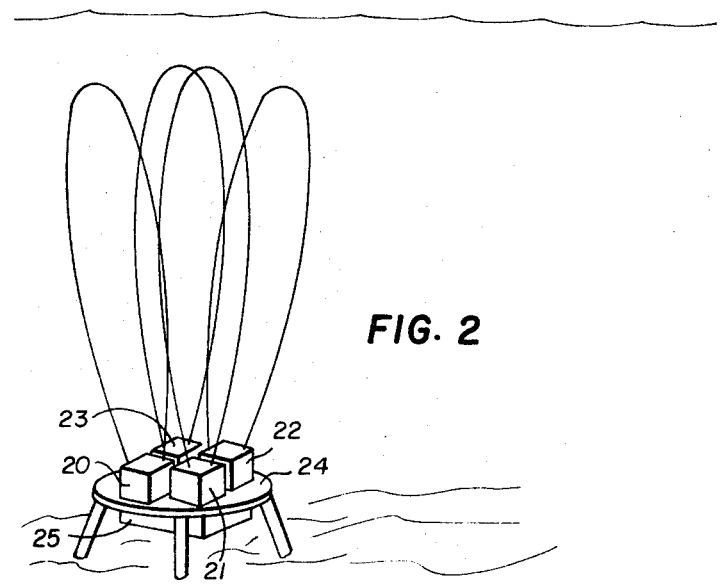
FIGS. 2 and 3 are partially schematic views of a preferred embodiment of the inventive system used to establish a pair of intersecting course lines.
Figure 3:
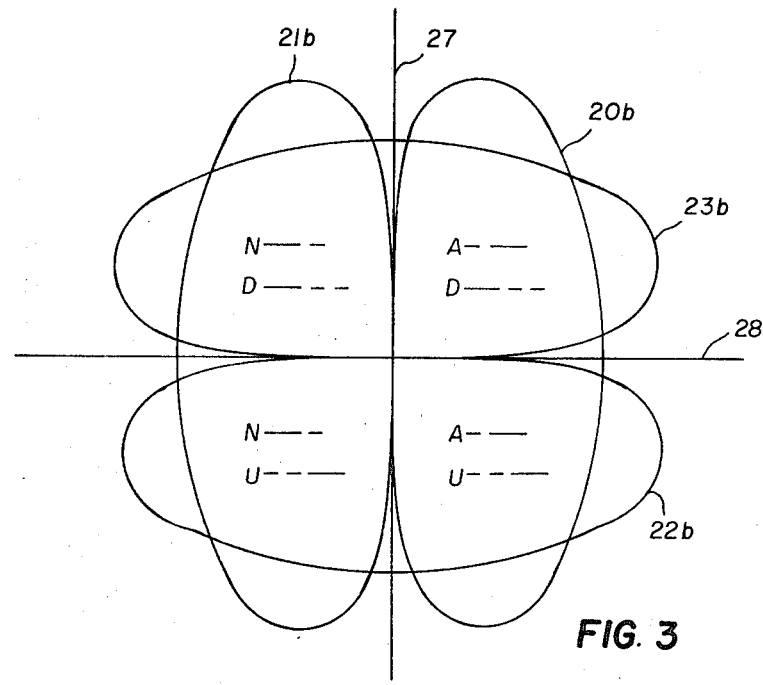

FIG. 2 shows 4 transducer arrays 20 - 23 mounted on a stand 24 on the ocean bottom 26 and driven by energy source 25. Transducers 20 - 23 are aimed generally vertically in relatively deep water so that the equi-signal bisector planes between pairs of the transducers are approximately perpendicular to each other to establish intersecting course lines at the surface of the water. The resulting pattern is shown in FIG. 3. The respective beams from each of the transducers 20 - 23 are identified as 20B - 23B, and such beams are respectively coded so that beam 20B forms an A and beam 21B forms an N in one pair, and beam 22B forms a U and 23B forms a D in another pair. An equi-signal channel 27 between A and N beams 20B and 21B forms one line at the water surface, and an equi-signal channel 28 between U beam 22B and D beam 23B forms another surface course line perpendicular to line 27.

A listener in a vessel navigating over the pattern of FIG. 3 can distinguish four quadrants between lines 27 and 28 by the predominant letters received in each. He can then maneuver the vessel to follow either of the lines 27 and 28 and can detect their intersection. The D and U beams can have a different frequency from the A and N beams with the listener switching back and forth between beam pairs as desired, or a single code generator can drive all four transducers 20-23 to form the A & N pair of beams for a few seconds alternately with a few seconds of the D and U beams.

Transducer arrays and mounting, power supplies and electronic equipment for producing and receiving beams in the inventive system are all generally known so that the system can readily be practiced by those skilled in the art once the concept of complementary coded, nutating beams is pointed out. Schematic representations of a preferred embodiment of suitable equipment for practicing the invention are shown in FIGS. 4 and 5.

Figure 4:
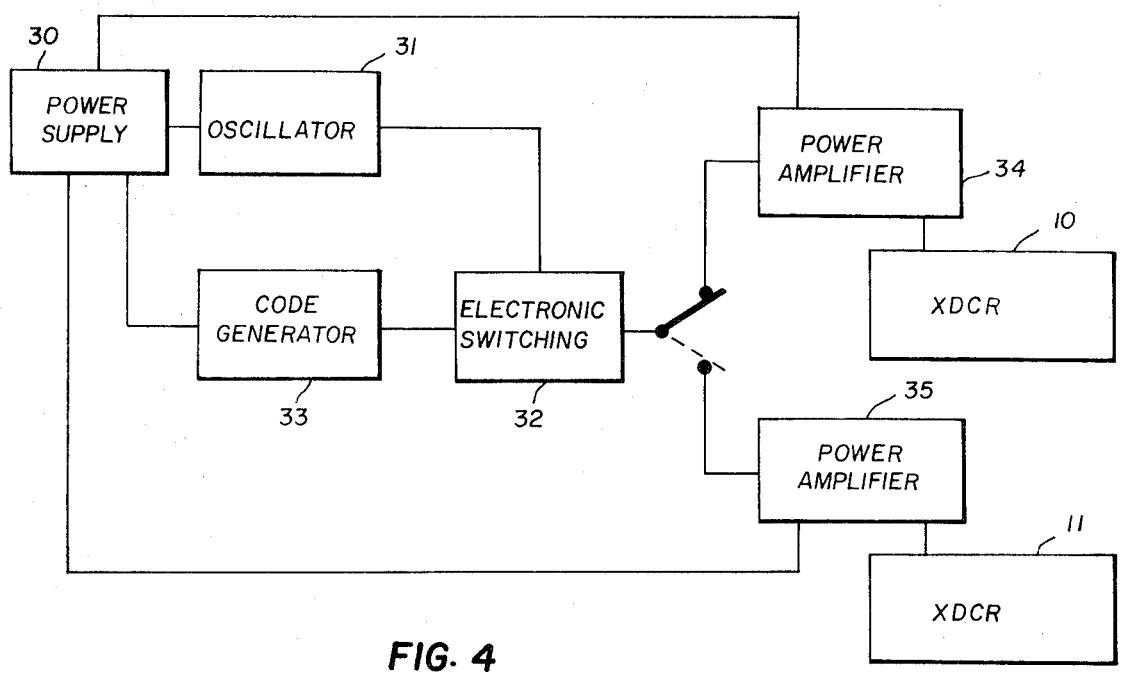
FIG. 4 is a schematic diagram of beam producing equipment for the inventive system.

The transmitting equipment of FIG. 4 includes transducers 10 and 11 driven by a power supply 30. An oscillator 31 produces a suitable ultrasonic frequency signal applied to electronic switching device 32 which is controlled by code generator 33. Code generator 33 is available from the computer arts for controlling the switching of device 32 in a predetermined time-interval pattern to form the desired complementary coded, nutating beams. Switching device 32 applies the oscillatory signal alternately to power amplifiers 34 and 35 according to such pattern for driving transducers 10 and 11 which can be made to produce A and N beams such as shown in FIG. 6.

Figure 5:
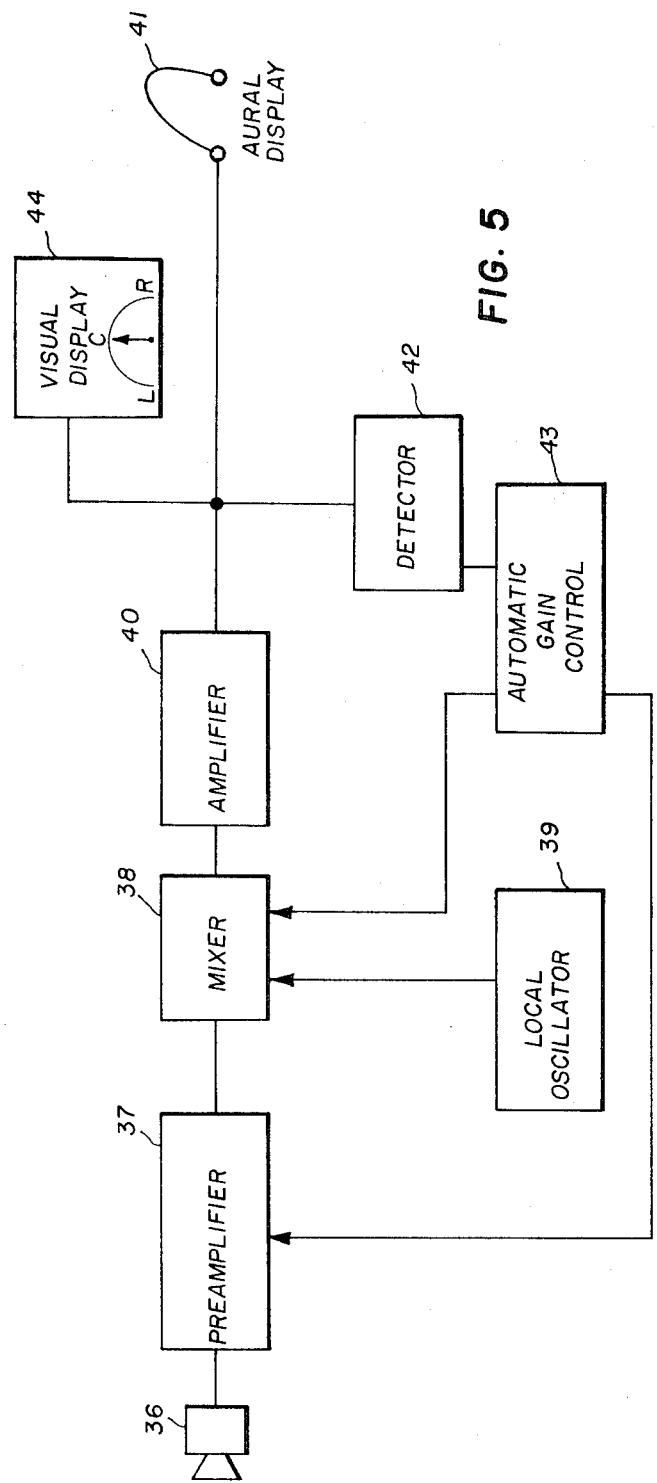
FIG. 5 is a schematic diagram of beam receiving equipment for the inventive system.

The receiver equipment shown in FIG. 5 includes a hydrophone transducer 36 mounted on a vessel for receiving the beams and producing an electric analog signal of the received beams. Such signal is applied to preamplifier 37 and to mixer 38 which mixes the received signal with a signal from local oscillator 39 having a frequency that differs from the beam frequency by a difference in the audio range of, for example, 800 Hz. This produces an audio frequency analog signal of the beam that is applied to amplifier 40 and fed to aural display 41 which can be earphones or a speaker. A detector 42 and an automatic gain control 43 is preferred to adjust the gain for optimum signal recognition against background noise. A visual display 44 is preferred to augment or alternate with aural display 41. Visual display 44 is preferably a right and left indicator with a pointer that moves to the right of center when the vessel is to the right of the equi-signal channel, to the left of center when the vessel is left of the equi-signal channel, and is centered when the vessel is on the equi-signal channel. This matches visual display to vessel position.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the navigational arts will find many uses for the inventive system, including military maneuvers, oil and mineral exploration, fishing, harbor entrance navigation, offshore benchmark or reference pint for reacquisition of a remote geodetic point, terminal navigation systems, station keeping in the open ocean, etc. Also, those skilled in acoustic and ultrasonic arts will appreciate that many transducers and different transmitting and receiving equipment can be used to practice the inventive system.

I claim:

1. A marine acoustic navigation system comprising:
   a. underwater support means;
   b. a pair of directional acoustic transducer arrays arranged together on said underwater support means and aimed at a small angle to each other to produce a pair of acoustic beams directed through the water and closely straddling a plane bisecting said angle;
   c. a source of oscillatory energy;
   d. a code generator;
   e. switching means controlled by said code generator for applying said energy alternately to said transducer arrays for predetermined intervals to form said acoustic means with complementary code patterns that are alternately nutating on and off;
   f. a vessel-mounted transducer for receiving said acoustic beams and forming electric analog signals of said beams; and
   g. means for aurally displaying said analog signals so that a listener can distinguish the code of one of said beams on one side of said bisector plane, and the code of the other of said beams on the other side of said bisector plane, and a steady tone on said bisector plane.

2. The navigation system of claim 1 wherein said complementary code comprises complementary letters of the Morse alphabet, and said code generator accomplishes said switching at a normal, aural code-receiving speed.

3. The system of claim 1 wherein said acoustic energy has an ultrasonic frequency, and said shipboard receiving means includes a transducer, an oscillator having a frequency different from the frequency of said acoustic energy, and a mixer for combining signals received from said beams with a signal from said oscillator to produce an audio frequency signal for said aural display.

4. The system of claim 3 including a visual indicator for displaying said analog signal.

5. The system of claim 1 including two pairs of said transducers aimed generally vertically and arranged so that said respective bisector planes are approximately perpendicular.

6. The system of claim 5 wherein said complementary code for each pair of transducers comprises a respective pair of complementary letters of the Morse alphabet, and said code generator drives said pairs of transducers alternately for predetermined intervals at a normal, aural, code-receiving speed.

7. The system of claim 5 wherein said pairs of transducers are operated at different frequencies.

8. The system of claim 1 wherein said transducers are directed horizontally.

9. The system of claim 1 wherein said transducers are directed vertically.

10. In a marine acoustic navigation system including: a pair of directional acoustic transducer arrays arranged underwater and aimed at a small angle to each other to produce a pair of acoustic beams directed through the water and closely straddling a plane bisecting said angle; a source of oscillatory energy; a code generator; and switching means controlled by said code generator for applying said energy alternately to said transducer arrays for predetermined intervals to form said acoustic beams with complementary code patterns; said system being characterized by:

a. a vessel-mounted transducer arranged for receiving said acoustic beams and forming electric analog signals of said beams;
b. means for aurally displaying said analog signals so that a listener can distinguish the code of one of said beams on one side of said bisector plane, and the code of the other of said beams on the other side of said bisector plane, and a steady tone on said bisector plane.

* * * * *